Patented Jan. 24, 1928.

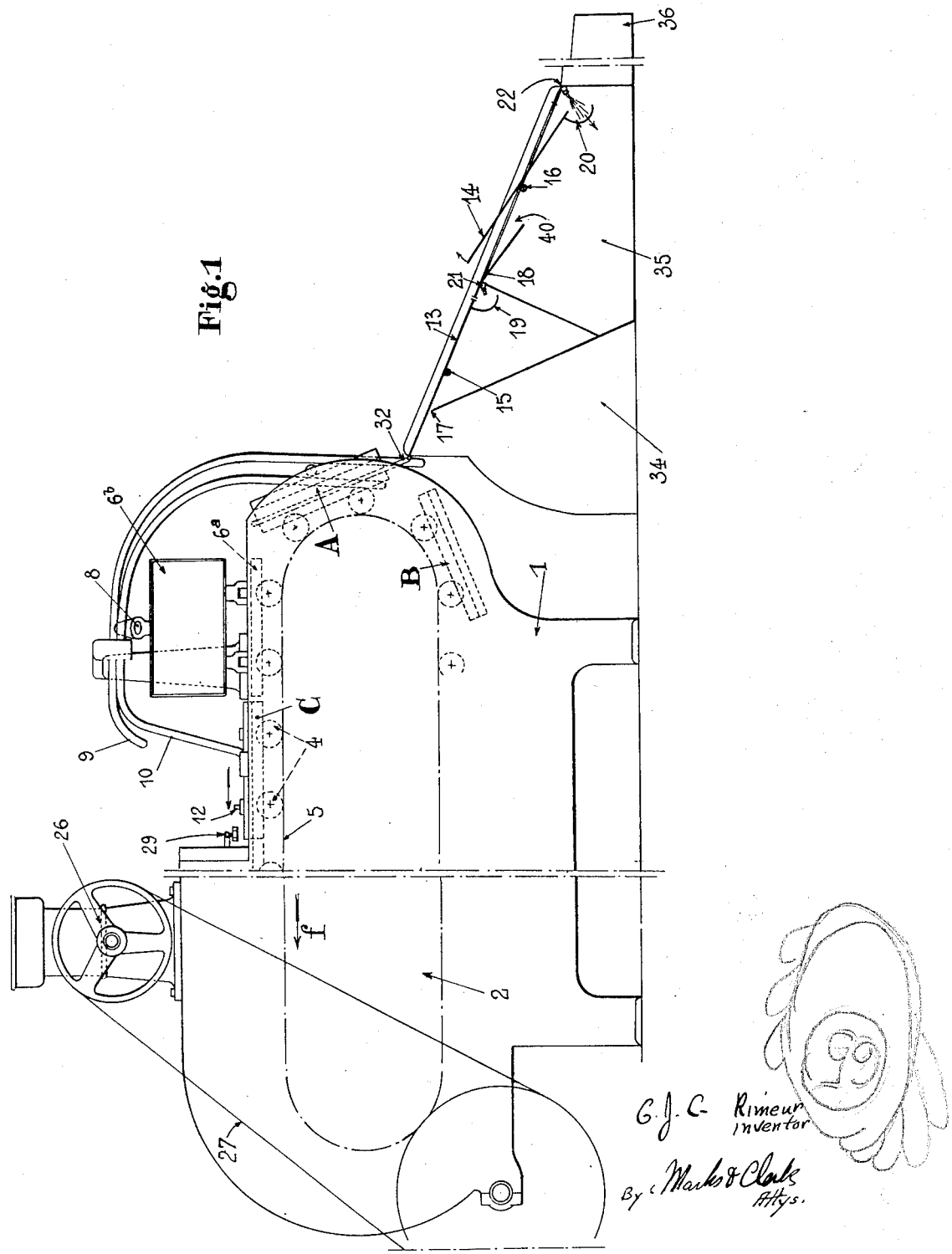

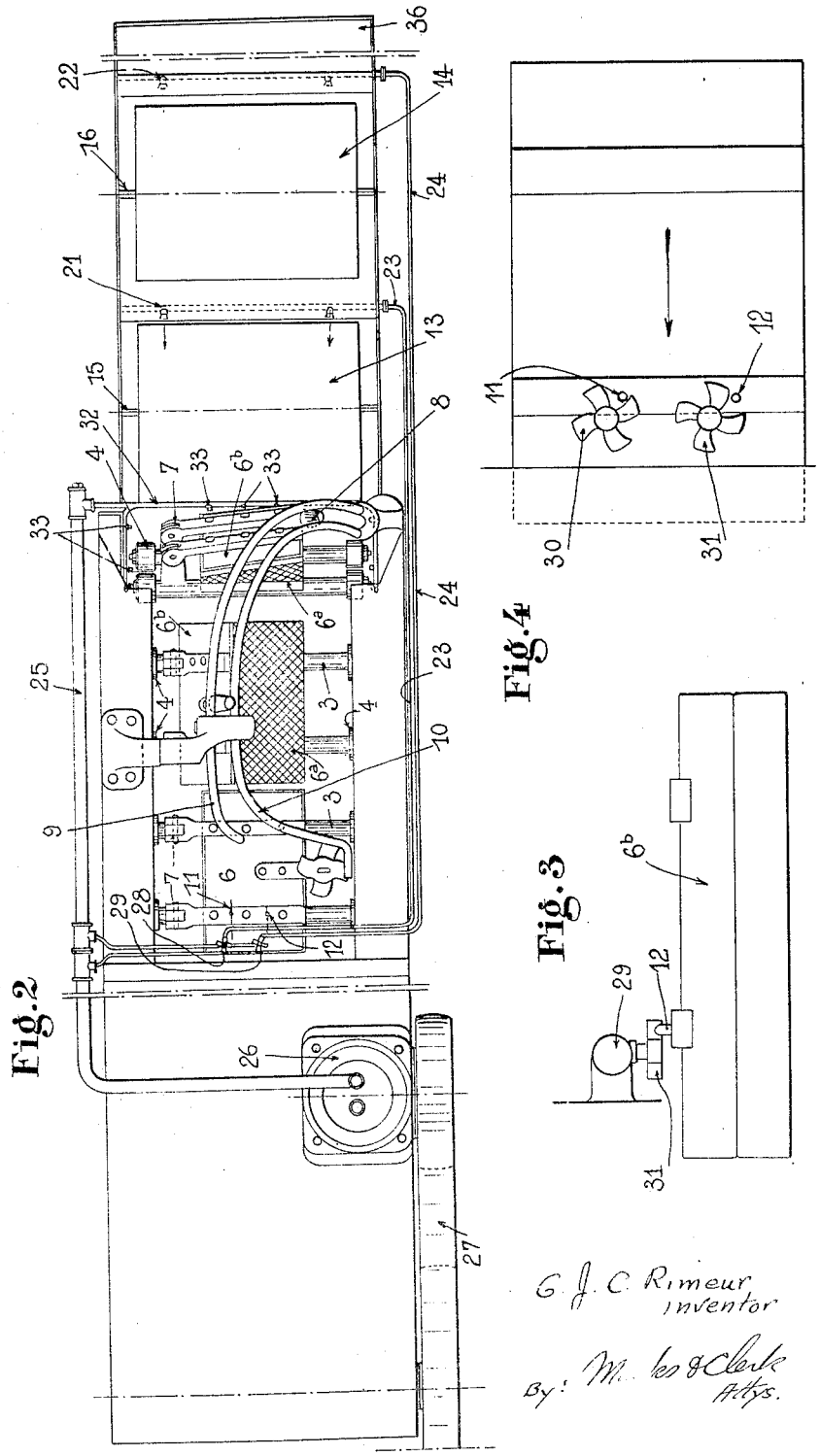

1,657,036

UNITED STATES PATENT OFFICE.

GEORGES JULIEN CLÉMENT RIMEUR, OF LA GARENNE-COLOMBES, FRANCE, ASSIGNOR OF ONE-HALF TO ANCIENS ÉTABLISSEMENTS A. SAVY, JEANJEAN & CIE., OF COURBEVOIE, FRANCE, AND ONE-HALF TO BAKER PERKINS LIMITED, OF LONDON, ENGLAND.

SORTING DEVICE FOR MACHINES FOR THE MANUFACTURE OF WAFERS AND LIKE ARTICLES.

Application filed April 4, 1927, Serial No. 180,916, and in France April 12, 1926.

The present invention relates to machines for the manufacture of wafers and like articles and chiefly to machines of the type in which the moulds are mounted on a conveyor which travels successively before a paste distributing device and through a baking oven, said moulds being automatically opened when leaving the oven to permit the removal of the finished cakes and the supply of the paste, and then automatically closed before entering the oven.

In such machines, when the wafers leave the moulds they are taken up singly by an operator and are placed on a table or in a receptacle; but in a given machine, all of the moulds are not employed to produce the same type of cake, and the moulds generally carry different patterns or lettering; in this event all the goods will be mixed in the receptacle and must be sorted one by one in order to classify them, thus requiring a special hand labour.

The present invention relates to a device for the automatic sorting of the goods when leaving the respective moulds, whereby all subsequent hand sorting will be obviated.

In accordance with the invention, the wafers leaving the moulds will drop upon an inclined plane consisting of a succession of pivoted plates which normally form a continuous inclined plane, below which the separate receptacles for the goods are disposed, the motion of each plate, to afford access to the corresponding receptacles, being obtained for instance by a supply of compressed air which is controlled by the forward travel of the said moulds.

Further characteristics of the invention will be specified in the following description, with reference to the appended drawings, showing a form of construction of a sorting device in accordance with the invention.

In this drawing:

Fig. 1 is an elevation of a machine which is provided with the said sorting device.

Fig. 2 is a plan view and

Figs. 3 and 4 are respectively elevational and plan views in detail of the compressed air valves.

The machine which is herein represented by way of example is of the known type comprising a main frame 1 whereof the part 2 forms a baking oven, and an endless conveyor constituted by axles 3 mounted on the rollers 4 which travel on the roller races 5, said conveyor being driven in the direction of the arrow $f$ by suitable power transmission means. Upon the axles 3 are mounted the wafer moulds 6 each of which consists of a lower plate $6^a$ and an upper plate or cover $6^b$, said plates being hinged together by the hinges 7 which are parallel with the direction of travel of the said conveyor. The lower plate of each mould, which is made of bronze, may be constructed, according to the type of wafer to be manufactured, with a smooth surface, or it may carry in sunken relief any suitable pattern such as crossed lines, designs or letters, which it is desired to form upon the goods. The cover of the mould is smooth.

The said cover is provided with a stud 8 adapted to engage in the space between the two ramps 9 and 10 which are secured to the frame and have the shape and disposition represented in the drawings, whereby the said moulds will be automatically opened and closed when each mould rises upon the upper part of the conveyor and then enters the tunnel oven 2.

The said moulds are divided into groups, and in each group the pattern or lettering on the lower plate of each mould is the same. The stops or tappets 11—12, whose function will be hereinafter described, are mounted, preferably in a removable manner, on the said conveyor, and may be placed for instance on the covers of certain of the moulds.

The inclined plane for the delivery of the finished wafers, which is situated at the front part of the machine, consists of a plurality of pivoted plates, two for instance, 13, 14, as herein represented. Each plate is mounted on an axle 15 or 16, in such manner that the said plates will normally make contact at their upper edges with a suitable stop member 17 or 18, and are then situated in the same inclined plane, but the arrangement is such that a relatively small effort, for instance some tens grams per sq. cm., will cause them to pivot on their axles. The lower edge of each plate is provided with a trough 19 or 20, near which are disposed one or more cocks 21 or 22; said cocks are mounted on two respective pipes 23, 24 which are mounted on the delivery pipe of an air compressor 26 disposed for instance on the frame of the machine and actuated through suitable power transmission means 27 by the machine itself.

Upon the said pipes 23—24, and for instance adjacent the inlet end of the oven 2, are disposed two respective closing devices, for instance two valves or cocks 28, 29 and the plug of each cock is provided with a four-branched star 30, 31, so disposed that each star is situated in the path of the respective movable tappets 11, 12 which are thus adapted to turn the stars through ¼ revolution during their forward travel.

If desired the machine may be provided with means for the automatic removal of the wafers from the moulds and for instance with the device described in my copending patent application Serial No. 180,917 of same date for "Improvements in machines for the manufacture of wafers and like articles". The said device consists of a U-shaped tube 32 which is connected with the delivery pipe 25 of the compressor and is provided with nozzles 33 adapted to discharge the air in the plane of the upper face of the lower plate of each mould when said mould assumes the position A shown in the drawings, and is slightly open.

Suitable partitions disposed below the pivoted plates 13—14 serve to form two receptacles 34—35 which are entirely distinct; a third receptacle 36 is placed at the end of the inclined plane.

The operation of the machine is as follows:

The conveyor being in continuous movement in the direction of the arrow $f$, the moulds on the upper part of the conveyor will enter the tunnel, circulate through the same and when leaving the tunnel they will be situated on the lower part of the conveyor; when at the front end of the machine they will rise while assuming an inclined position, and will pass through a vertical position in which the stud 8 of each mould will be engaged between the ramps 9 and 10. The mould which is in the position A will thus be slightly opened, and the air which is discharged continuously from the nozzles 33 will remove the cake from the plate 6ª; since the mould is now much inclined, the cake will drop off.

Let it be supposed that previously to this operation, a tappet 12, mounted on one of the moulds situated in front, has brought the cock 29 into its open position, and that a tappet 11 has turned the cock 28 into the closing position, and further, that the cocks 21 and 22 have both been preliminarily opened; a stream of compressed air will thus be discharged from the cocks 22 against the trough 20; the plate 14 is thus held in the open position as illustrated whilst the plate 15 will remain closed by its own weight. In these conditions, the wafer will drop from the mould which is in the position A and will slide upon the plate 14, passing thence through 40 and dropping into the receptacle 35.

The said mould continuing to travel, will open completely and will then pass below the automatic paste feeding device (not shown); the stud 8 will slide on the left-hand part of the ramp 10, and the mould then closes and enters the oven 2.

If the mould which is in the position B is the first mould of a group serving for the manufacture of wafers of a different type from the one produced by the mould situated at A, the mould shown in the drawings in the position C must also be provided with tappets 11 and 12. At the same time that the mould proceeds from the position B to the position A, the tappet 12 of the mould at C turns the star 31 through 90 degrees and thus closes the cock 29, while the tappet 11 turns the star 30 through 90 degrees, thus opening the cock 28. This will cause the plate 13 to open and the plate 14 to close, and the new cake drops from the machine directly into the receptacle 34.

In this manner all of the goods from the first set of moulds will drop into the receptacle 35 and all the goods from the second set will drop into the receptacle 34.

In the subsequent motion, if a mould which is provided only with a tappet 11 now closes the cock 28, the plate 13 will close, and since the cock 29 remains closed, the plate 14 also remains closed. The new wafers which are made by the following moulds, and may belong to a third class, will slide upon the two plates 13 and 14 which are in line and will drop into the receptacle 36.

In this manner the use of the two plates 13 and 14 permits the manufacture and the exact automatic sorting of three different types of goods.

In general, if the machine is to serve for the simultaneous manufacture of N different types of wafers, the sorting inclined plane will comprise N—1 pivoting plates analogous to the plates 13—14, and the goods of the Nth group will drop into the receptacle 36. The machine will obviously comprise N—1 pipes analogous to the pipes 23—24, each being provided with a closing device, and the tappets for opening and closing said devices will be suitably disposed upon the moulds.

The operation of the machine is thus entirely automatic and requires no additional hand labour.

The tappets 11 and 12 may be secured to the moulds in any suitable manner, and may for instance be screwed into recesses provided on the covers of all the moulds, and can thus be mounted on any of the moulds as desired, whereby the operation of the machine may be suitably modified.

Obviously, the above described sorting means might be utilized as well upon a machine of another type from that shown solely by way of example. The machine might be further provided with automatic means for detaching the wafers which differ from the means herein described, or it might be unprovided with any such detaching means, this operation being performed by hand.

The invention is not either limited to the construction herein described and represented as concerns the sorting device, and this construction is susceptible of numerous modifications. For instance, the air discharged by the cocks 21—22 and by the nozzles 33 may be supplied by any available source of compressed air; the tappets 11—12 on the moulds and the cocks 28—29 may have other dispositions than those herein represented, without departing from the principle of the invention; said cocks may be replaced by valves of any known type or other closing means disposed in such manner as to be controlled by the said moulds during their travel.

Having now described my invention, what I claim as new and desire to secure by Letters Patent is:

1. In an automatic machine for the manufacture of wafers and like articles the combination of a mould conveyor, a number of successive inclined traps normally forming a continuous inclined plane from the delivery end of the machine, a number of receptacles for the finished articles respectively closed at the top by said traps and means controlled by the forward motion of said conveyor for operating said traps and temporarily opening said receptacles in a predetermined order of succession.

2. In an automatic machine for the manufacture of wafers and like articles, the combination of a mould conveyor, a number of successive plates respectively pivoted about a horizontal axis and normally forming a continuous inclined plane from the delivery and of the machine, a number of receptacles for the finished articles respectively closed at the top by said pivoted plates and means controlled by the forward motion of said conveyor for operating said plates and temporarily opening said receptacles in a predetermined order of succession.

3. In an automatic machine for the manufacture of wafers and like articles the combination of a mould conveyor, a number of successive plates respectively pivoted about a horizontal axis and normally forming a continuous inclined plane from the delivery end of the machine, a number of receptacles for the finished articles respectively closed at the top by said pivoted plates, and means controlled by the forward motion of said conveyor whereby jets of compressed air may be directed against said plates for operating the same and temporarily opening said receptacles in a predetermined order of succession.

4. In an automatic machine for the manufacture of wafers and like articles the combination of a mould conveyor, a number of successive plates respectively pivoted about a horizontal axis and normally forming a continuous inclined plane from the delivery end of the machine, a number of receptacles for the finished articles respectively closed at the top by said pivoted plates, a source of compressed air, nozzles adapted to direct jets of compressed air against said plates for operating the same and opening said receptacles and means controlled by the forward motion of said conveyor for respectively connecting said nozzles to said source of compressed air for a stated time and in a predetermined order of succession.

5. In an automatic machine for the manufacture of wafers and like articles the combination of a mould conveyor, a number of successive plates respectively pivoted about a horizontal axis, and normally forming a continuous inclined plane from the delivery end of the machine, a number of receptacles for the finished articles respectively closed at the top by said pivoted plates, a source of compressed air, nozzles adapted to direct jets of compressed air against said plates for operating the same and opening said receptacles, pipes respectively connecting said nozzles to said source of compressed air, valves provided on said pipes and control members carried by said conveyor and adapted to operate said valves so that communication is afforded between said source of compressed air and the operating nozzles of one, as a maximum, of said pivoted plates.

6. In an automatic machine as claimed in claim 5, the further feature residing in that each of said valves consists of a cock provided with a four branched handle while the control members carried by the conveyor consist of studs adapted to actuate said handle always in the same direction for successively opening and closing said cock.

7. In an automatic machine for the manufacture of wafers and like articles the combination of a mould conveyor, a number of successive plates respectively pivoted about a horizontal axis and normally forming a continuous inclined plane from the delivery end of the machine, a number of receptacles for the finished articles respectively closed at the top by said pivoted plates, an air compressor supported by the machine frame and adapted to be actuated simultaneously with said conveyor, nozzles adapted to direct jets of compressed air against said plates for operating the same and opening said re-receptacles and means controlled by the forward motion of said conveyor for respectively connecting said nozzles to said air compressor for a stated time and in a predetermined order of succession.

8. In an automatic machine for the manufacture of wafers and like articles the combination of a conveyor, moulds carried by said conveyor and adapted to assume an inclined position at the delivery end of the machine, means for opening the moulds in the said inclined position, a number of successive inclined traps normally forming a continuous inclined plane from the delivery end of the machine, a number of receptacles for the finished articles respectively closed at the top by said traps, means for directing jets of compressed air sidewise upon the article carrying plate of each mould when said mould is being opened and whereby the article carried by said plate is detached therefrom and allowed to drop upon said inclined plane and means controlled by the forward motion of said conveyor for operating said traps and temporarily opening said receptacles in a predetermined order of succession.

In testimony whereof I have signed my name to this specification.

GEORGES JULIEN CLÉMENT RIMEUR.